US006525837B1

(12) United States Patent
Adkins et al.

(10) Patent No.: US 6,525,837 B1

(45) Date of Patent: Feb. 25, 2003

(54) PRINTER ASSEMBLY AND METHOD FOR DETERMINING THE POSITION OF A PRINTER COMPONENT

(75) Inventors: Christopher Alan Adkins, Lexington, KY (US); Lucas David Barkley, Lexington, KY (US); Michael Anthony Marra, III, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/895,284

(22) Filed: Jun. 29, 2001

(51) Int. Cl.$^{7}$ .............................................. G06F 15/00

(52) U.S. Cl. ................................... 358/1.5; 271/265.02

(58) Field of Search ......................... 358/1.5, 445, 443; 700/213; 271/265.02

(56) References Cited

U.S. PATENT DOCUMENTS 4,315,198 A * 2/1982 Lin et al. .................... 318/594
4,876,679 A * 10/1989 Mukai ..................... 369/44.29
5,243,412 A 9/1993 Goukura et al.
5,254,995 A 10/1993 Hantke
5,373,536 A 12/1994 Dehner, Jr. et al.
5,488,481 A 1/1996 Okada et al.
5,590,161 A 12/1996 Meyn et al.
5,724,397 A 3/1998 Torsti
5,815,212 A 9/1998 Edwards et al.
5,841,430 A 11/1998 Kurikko
5,907,367 A 5/1999 Edwards et al.
6,011,774 A 1/2000 Cha
6,014,176 A 1/2000 Nayebi et al.
6,118,770 A 9/2000 Pianka et al.
6,188,440 B1 2/2001 Toujima et al.
6,189,127 B1 2/2001 Fang et al.

* cited by examiner

*Primary Examiner*—Khoi H. Tran
(74) *Attorney, Agent, or Firm*—Thompson Hine, LLP; Jacqueline Daspit

(57) ABSTRACT

A printer assembly and a method for determining the position of a printer component, such as a printer paper-feed roller, during a move of the printer component from an initial position toward a desired final position. An analog encoder is operatively connected to the printer component, and a threshold device is connected to the analog output of the analog encoder. The position of the printer component is determined from the digital output of the threshold device and a digitization of the analog output of the analog encoder.

21 Claims, 2 Drawing Sheets

PRINTER ASSEMBLY AND METHOD FOR DETERMINING THE POSITION OF A PRINTER COMPONENT

TECHNICAL FIELD

The present invention relates generally to printers, and more particularly to a printer assembly and to a method for determining the position of a printer component.

BACKGROUND OF THE INVENTION

Printers include those printers having a printer component, such as a printer paper-feed roller, whose position must be determined for accurate operation of the printer. Typically, an analog encoder is operatively connected to the printer paper-feed roller, and an analog-to-digital converter is operatively connected to the output of the analog encoder to sample the analog encoder signals. The position of the paper-feed roller is determined from the output of the analog-to-digital converter. However, an expensive analog-to-digital converter must be used to sample the incoming signals fast enough (i.e., accurate enough) that no position information is lost.

What is needed is an improved printer assembly and an improved method for determining the position of a printer component such as a printer paper-feed roller.

SUMMARY OF THE INVENTION

A first embodiment of the invention is for a printer assembly having a printer component, a processor, an analog encoder, and a threshold device. The printer component is movable from an initial position toward a desired final position. The threshold device has a digital output connected to the processor. The analog encoder is operatively connected to the printer component and has an analog output connected to the threshold device and operatively connected to the processor. The processor determines the position of the printer component from the digital output and a digitization of the analog output.

A first method of the invention is for determining the position of a printer paper-feed roller during a paper index move from an initial position toward a desired final position, wherein an analog encoder is operatively connected to the printer paper-feed roller, and wherein a threshold device is connected to the analog output of the analog encoder. The first method includes steps a) through f). Step a) includes selecting a digital coarse position transition point. Step b) includes selecting an analog fine position transition point. Step c) includes initially determining the position as a digital coarse position from the digital output of the threshold device. Step d) includes determining a digitized fine position from the analog output of the analog encoder starting when the determined digital coarse position first is at least equal to the digital coarse position transition point. Step e) includes setting a digitized analog coarse position equal to the digital coarse position when the determined digitized analog fine position first is at least equal to the analog fine position transition point. Step f) includes, after step e), calculating the position by combining the set digitized analog coarse position and the determined digitized analog fine position. In one implementation of the first method, the threshold device is a Schmitt-trigger threshold device. In the same or another implementation of the first method of the invention, the analog output includes periodic first and second analog signals substantially ninety degrees out of phase, and the digital output includes a first digital signal corresponding to the first analog signal and a second digital signal corresponding to the second analog signal.

A broadly described expression of a method of the invention is a method for determining the position of a printer component during a move of the printer component from an initial position toward a desired final position, wherein an analog encoder is operatively connected to the printer component, and wherein a threshold device is connected to the analog output of the analog encoder. The broadly described expression of the method of the invention includes steps a) through f) which are identical to steps a) through f) described above for the first method of the invention.

Several benefits and advantages are derived from the first embodiment of the invention and from the first and the broadly-described expression of a method of the invention. Accurate digital coarse position information is obtained from the threshold device. Accurate digitized analog fine position information is obtained from the analog encoder through a low-cost analog-to-digital converter (ADC). Synchronization of the digital coarse position to the digitized analog coarse position is done by selecting a digital coarse position transition point and an analog fine position transition point which enables the digitized analog fine position to be associated with the correct digital coarse position despite uncertainties in switching of the threshold device. The expensive high-sampling-rate ADC of the prior art is replaced with the previously-described low-cost ADC and with an inexpensive threshold device, such as a Schmitt-trigger threshold device. The low-cost ADC results from choosing a digital coarse position transition point corresponding to when the position of the printer paper-feed roller or other printer component is changing slowly enough (usually near the end of a move) so that a low-sampling-rate ADC provides the desired sampling rate.

DETAILED DESCRIPTION

Figure 1:
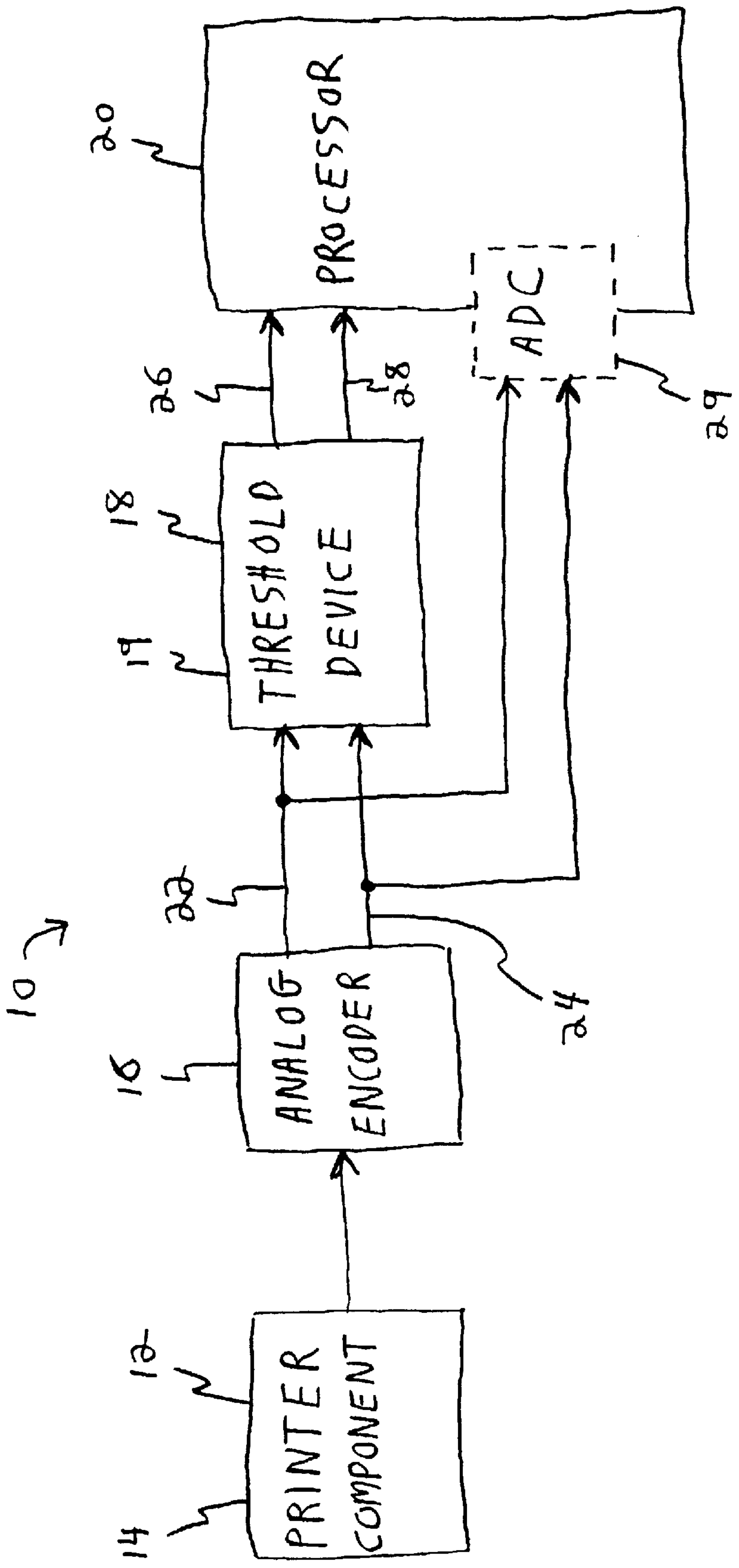
FIG. 1 is a block diagram of a first embodiment of a printer assembly of the invention for performing a method of the invention and includes an analog encoder outputting first and second analog signals and a threshold device outputting first and second digital signals.

FIG. 1 illustrates a first embodiment of a printer assembly 10 (such as an ink jet printer assembly or other printer assembly) of the invention. The printer assembly 10 includes a printer component 12 (such as a printer paper-feed roller 14, or a printhead carriage, a paper loader or other component). The printer component 12 is movable from an initial position toward a desired final position. The printer assembly 10 also includes an analog encoder 16 and a threshold device 18 (such as a Schmitttrigger threshold device 19 or other threshold device). A threshold device is a device having a digital output which has two states (e.g., “0” and “1”) and which changes state (e.g., between “0” and “1”) twice during one cycle of an analog signal input. The printer assembly 10 additionally includes a processor 20 (such as an application specific integrated circuit known as an ASIC). The threshold device 18 has a digital output (such as first and second digital signals 26 and 28) connected to the processor 20. The analog encoder 16 is operatively connected to the printer component 12 and has an analog output (such as first and second analog signals 22 and 24) connected to the threshold device 18 and operatively connected to the processor 20. The processor 20 determines the position of the printer component 12 from the digital output (such as signals 26 and 28) and a digitization of the analog output (such as signals 22 and 24). In one example, digitization of the analog output is accomplished by a low-sampling-rate analog-to-digital converter (ADC) 29. The dashed boundary of the ADC 29 in FIG. 1 indicates that the ADC can be internal to the processor 20 or an external, independent ADC.

A first method of the invention is for determining the position of a printer paper-feed roller 14 during a paper index move from an initial position toward a desired final position, wherein an analog encoder 16 is operatively connected to the printer paper-feed roller 14, and wherein a threshold device 18 is connected to the analog output of the analog encoder 16. A threshold device 18 is a device which outputs a digital signal which undergoes two state changes per cycle of an analog signal input. The method includes steps a) through f). Step a) includes selecting a digital coarse position transition point, and step b) includes selecting an analog fine position transition point. Step c) includes initially determining the position as a digital coarse position from the digital output of the threshold device 18. Step d) includes determining a digitized analog fine position from the analog output of the analog encoder 16 starting when the determined digital coarse position first is at least equal to the digital coarse position transition point. Step e) includes setting a digitized analog coarse position equal to the digital coarse position when the determined digitized analog fine position first is at least equal to the analog fine position transition point. Step f) includes, after step e), calculating the position by combining the set digitized analog coarse position and the determined digitized analog fine position.

In one implementation of the first method, the digital coarse position transition point is selected closer to the desired final position than to the initial position. In one variation, the digital output includes a plurality of pulses, wherein the digital coarse position is determined from the pulse state changes, and wherein the digital coarse position transition point is selected within a predetermined number of pulses of the desired final position. In one example, the digital coarse position transition point is chosen to correspond to when the position of the printer paper-feed roller 14 is changing slowly enough (usually near the end of a move) so that a low-sampling-rate ADC 29 provides the desired accuracy.

In one modification, the digital output includes a plurality of pulses, wherein the digital coarse position is determined from the pulse state changes, and wherein the analog fine position transition point is chosen to correspond to a position between the latest expected start of a pulse state change corresponding to the digital coarse position transition point and the earliest expected start of the next-in-time pulse state change.

In one example, the threshold device 18 is a Schmitt-trigger threshold device 19. Other threshold devices are left to the artisan.

In one example of the first method of the invention, the analog output includes periodic first and second analog signals 22 and 24 substantially ninety degrees out of phase, and the digital output includes a first digital signal 26 corresponding to the first analog signal 22 and a second digital signal 28 corresponding to the second analog signal 24. In one variation, the first and second digital signals 26 and 28 include pulses, and the digital coarse position is determined from the pulse state changes of the first and second digital signals 26 and 28. In the same or different variation, the analog fine position transition point is chosen between the latest expected start of a pulse state change of one of the first and second digital signals 26 and 28 corresponding to the digital coarse position transition point and the earliest expected start of a next-in-time pulse state change of the other of the first and second digital signals 26 and 28.

Figure 2:
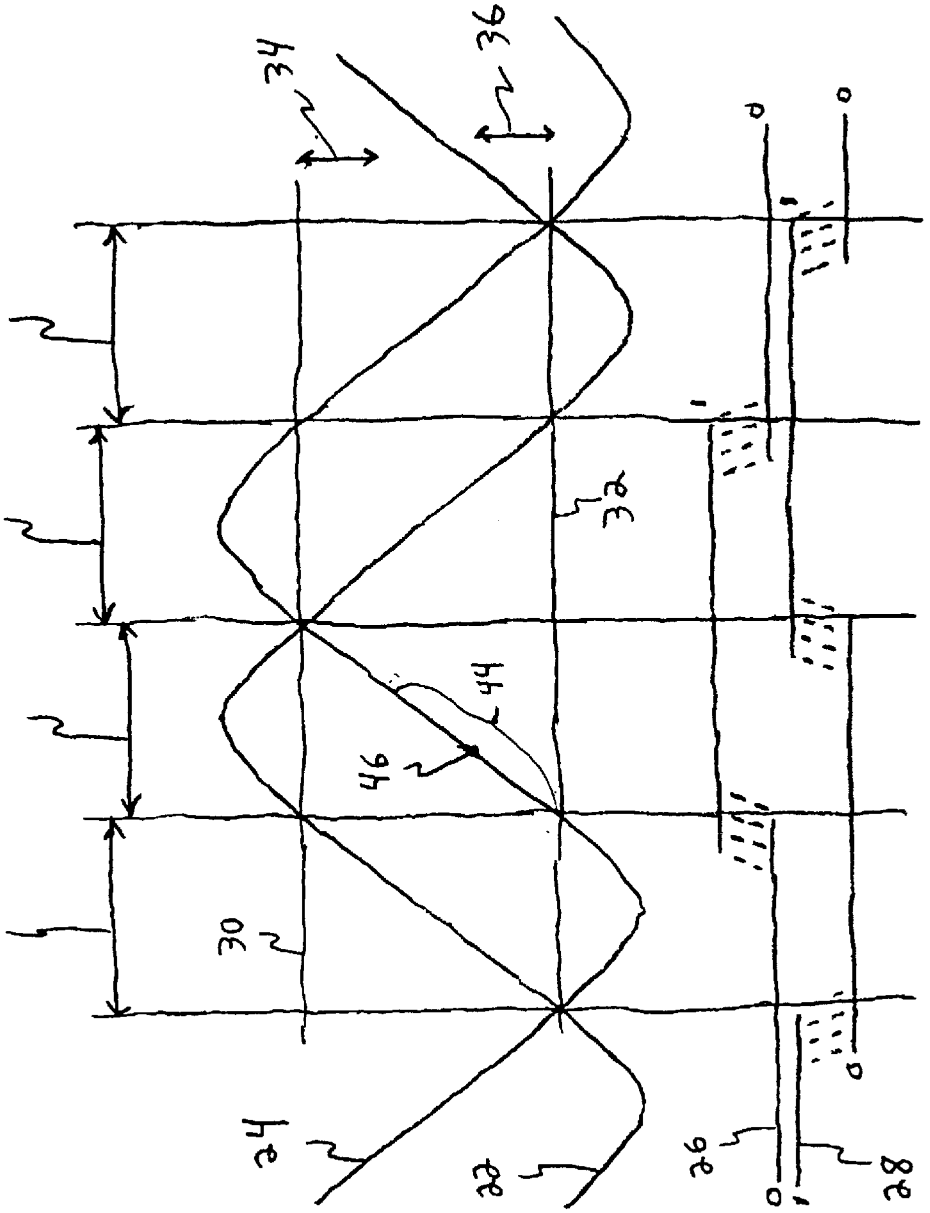
FIG. 2 is a diagram showing the shape and the relationship of the first and second analog and digital signals of FIG. 1, wherein the uncertainty of the location of the pulse state changes of the first and second digital signals is indicated by multiple dashed lines between pulse states.

By way of illustration, and referring to FIG. 2, a cycle of the first and second analog signals 22 and 24 and the corresponding first and second digital signals 26 and 28 is divided into four regions to provide quadrature with the high crossover 30 and the low crossover 32 and the upper switching range 34 and the lower switching range 36 indicated on the signals 22–28 for the Schmitt-trigger threshold device 19. The uncertainty of the location of the pulse state changes of the first and second digital signals 26 and 28 is indicated by multiple dashed lines between pulse states. Let region 40 correspond to a coarse position of 0, region 41 to a coarse position of 1, region 42 to a coarse position of 2 and region 43 to a coarse position of 3. Region 40 corresponds to (0,0) for the value of (first digital signal 26, second digital signal 28), region 41 corresponds to (1,0) for the value of (first digital signal 26, second digital signal 28), region 42 corresponds to (1,1) and region 43 to (0,1) where such paired states are used to determine the digital coarse position. The analog fine position is determined from the start of the analog signal associated with the start of the region where the digital coarse position first is at least equal to the digital coarse position transition point as follows. If a digital coarse position transition point of 0 (region 40) is chosen, the first analog signal 22 is used, wherein the first analog signal has positive slope and wherein the low crossover is subtracted from the first analog signal to calculate the fine analog position. If a digital coarse position transition point of 1 (region 41) is chosen, the second analog signal 24 is used, wherein the second analog signal has positive slope and wherein the low crossover is subtracted from the second analog signal to calculate the fine analog position. If a digital coarse position transition point of 2 (region 42) is chosen, the first analog signal 22 is used, wherein the first analog signal has negative slope and wherein the first analog signal is subtracted from the high crossover to calculate the fine analog position. If a digital coarse position transition point of 3 (region 43) is chosen, the second analog signal 24 is used, wherein the second analog signal has a negative slope and when the second analog signal is subtracted from the high crossover to calculate the fine analog position. As an example, if the digital coarse position transition point is chosen as 1 (i.e., the start of region 41), then acceptable values for the analog fine position transition point would lie within (and preferably substantially midway within) acceptable region 44. One such choice for the analog fine position transition point is point 46 corresponding to a value of 0.3 for the analog fine position. Combining algorithms for combining the set analog coarse position and the analog fine position are left to the artisan. In one technique, the values are merely added giving the position at point 46 as 1.3.

In another implementation of the first method, the analog encoder 16 has only the first analog signal 22 for the analog output, and the threshold device 18 has only the first digital signal 26 for the digital output. Other numbers of signals for the analog and digital outputs are left to the artisan.

A broadly described expression of a method of the invention is a method for determining the position of a printer component 12 during a move of the printer component 12 from an initial position toward a desired final position, wherein an analog encoder 16 is operatively connected to the printer component 12, and wherein a threshold device 18 is connected to the analog output of the analog encoder 16. The broadly described expression of the method of the invention includes steps a) through f) which are identical to steps a) through f) described above for the first method of the invention.

Several benefits and advantages are derived from the first embodiment of the invention and from the first and the broadly-described expression of a method of the invention. Accurate digital coarse position information is obtained from the threshold device. Accurate digitized analog fine position information is obtained from the analog encoder through a low-cost analog-to-digital converter (ADC). Synchronization of the digital coarse position to the digitized analog coarse position is done by selecting a digital coarse position transition point and an analog fine position transition point which enables the digitized analog fine position to be associated with the correct digital coarse position despite uncertainties in switching of the threshold device. The expensive high-sampling-rate ADC of the prior art is replaced with the previously-described low-cost ADC and with an inexpensive threshold device, such as a Schmitt-trigger threshold device. The low-cost ADC results from choosing a digital coarse position transition point corresponding to when the position of the printer paper-feed roller or other printer component is changing slowly enough (usually near the end of a move) so that a low-sampling-rate ADC provides the desired sampling rate.

The foregoing description of an embodiment and several methods of the invention has been presented for purposes of illustration. It is not intended to be exhaustive or to limit the invention to the precise methods disclosed, and obviously many modifications and variations are possible in light of the above teaching. It is intended that the scope of the invention be defined by the claims appended hereto.

What is claimed is:

1. A method for determining the position of a printer paper-feed roller during a paper index move from an initial position toward a desired final position, wherein an analog encoder is operatively connected to the printer paper-feed roller, wherein a threshold device is connected to the analog output of the analog encoder, and wherein the method comprises the steps of:

a) selecting a digital coarse position transition point;

b) selecting an analog fine position transition point;

c) initially determining the position as a digital coarse position from the digital output of the threshold device;

d) determining a digitized analog fine position from the analog output of the analog encoder starting when the determined digital coarse position first is at least equal to the digital coarse position transition point;

e) setting a digitized analog coarse position equal to the digital coarse position when the determined digitized analog fine position first is at least equal to the analog fine position transition point; and f) after step e), calculating the position by combining the set digitized analog coarse position and the determined digitized analog fine position.

2. The method of claim 1, wherein the digital coarse position transition point is selected closer to the desired final position than to the initial position.

3. The method of claim 2, wherein the digital output includes a plurality of pulses, wherein the digital coarse position is determined from the pulse state changes, and wherein the digital coarse position transition point is selected within a predetermined number of pulses of the desired final position.

4. The method of claim 1, wherein the digital output includes a plurality of pulses, wherein the digital coarse position is determined from the pulse state changes, and wherein the analog fine position transition point is chosen to correspond to a position between the latest expected start of a pulse state change corresponding to the digital coarse position transition point and the earliest expected start of the next-in-time pulse state change.

5. The method of claim 4, wherein the threshold device is a Schmitt-trigger threshold device.

6. The method of claim 1, wherein the analog output includes periodic first and second analog signals substantially ninety degrees out of phase, and wherein the digital output includes a first digital signal corresponding to the first analog signal and a second digital signal corresponding to the second analog signal.

7. The method of claim 6, wherein the first and second digital signals include pulses, and wherein the digital coarse position is determined from the pulse state changes of the first and second digital signals.

8. The method of claim 7, wherein the analog fine position transition point is chosen between the latest expected start of a pulse state change of one of the first and second digital signals corresponding to the digital coarse position transition point and the earliest expected start of a next-in-time pulse state change of the other of the first and second digital signals.

9. The method of claim 7, wherein the threshold device is a Schmitt-trigger threshold device.

10. The method of claim 1, wherein the threshold device is a Schmitt-trigger threshold device.

11. A method for determining the position of a printer component during a move of the printer component from an initial position toward a desired final position, wherein an analog encoder is operatively connected to the printer component, wherein a threshold device is connected to the analog output of the analog encoder, and wherein the method comprises the steps of:

a) selecting a digital coarse position transition point;

b) selecting an analog fine position transition point;

c) initially determining the position as a digital coarse position from the digital output of the threshold device;

d) determining a digitized analog fine position from the analog output of the analog encoder starting when the determined digital coarse position first is at least equal to the digital coarse position transition point;

e) setting a digitized analog coarse position equal to the digital coarse position when the determined digitized analog fine position first is at least equal to the analog fine position transition point; and f) after step e), calculating the position by combining the set digitized analog coarse position and the determined digitized analog fine position.

12. The method of claim 11, wherein the digital coarse position transition point is selected closer to the desired final position than to the initial position.

13. The method of claim 12, wherein the digital output includes a plurality of pulses, wherein the digital coarse position is determined from the pulse state changes, and wherein the digital coarse position transition point is selected within a predetermined number of pulses of the desired final position.

14. The method of claim 11, wherein the digital output includes a plurality of pulses, wherein the digital coarse position is determined from the pulse state changes, and wherein the analog fine position transition point is chosen to correspond to a position between the latest expected start of a pulse state change corresponding to the digital coarse position transition point and the earliest expected start of the next-in-time pulse state change.

15. The method of claim 14, wherein the threshold device is a Schmitt-trigger threshold device.

16. The method of claim 11, wherein the analog output includes periodic first and second analog signals substantially ninety degrees out of phase, and wherein the digital output includes a first digital signal corresponding to the first analog signal and a second digital signal corresponding to the second analog signal.

17. The method of claim 16, wherein the first and second digital signals include pulses, and wherein the digital coarse position is determined from the pulse state changes of the first and second digital signals.

18. The method of claim 17, wherein the analog fine position transition point is chosen between the latest expected start of a pulse state change of one of the first and second digital signals corresponding to the digital coarse position transition point and the earliest expected start of a next-in-time pulse state change of the other of the first and second digital signals.

19. The method of claim 17, wherein the threshold device is a Schmitt-trigger threshold device.

20. The method of claim 11, wherein the threshold device is a Schmitt-trigger threshold device.

21. A printer assembly comprising:

a) a printer component movable from an initial position toward a desired final position;

b) a processor;

c) a threshold device having a digital output connected to the processor; and d) an analog encoder operatively connected to the printer component and having an analog output connected to the threshold device and operatively connected to the processor, wherein the processor determines the position of the printer component from the digital output and a digitization of the analog output.

* * * * *